United States Patent
Tashiro et al.

(10) Patent No.: US 10,021,274 B2
(45) Date of Patent: Jul. 10, 2018

(54) COLOR PROCESSING APPARATUS, COLOR PROCESSING SYSTEM, AND NON-TRANSITORY COMPUTER READABLE MEDIUM

(71) Applicant: FUJI XEROX CO., LTD., Tokyo (JP)

(72) Inventors: Yosuke Tashiro, Kanagawa (JP); Kaori Tominaga, Kanagawa (JP); Shinsuke Sugi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/212,574

(22) Filed: Jul. 18, 2016

(65) Prior Publication Data

US 2017/0251127 A1 Aug. 31, 2017
US 2018/0139356 A9 May 17, 2018

(30) Foreign Application Priority Data

Feb. 29, 2016 (JP) ................................. 2016-037936

(51) Int. Cl.
*H04N 1/60* (2006.01)

(52) U.S. Cl.
CPC ......... *H04N 1/6005* (2013.01); *H04N 1/6008* (2013.01); *H04N 1/6033* (2013.01); *H04N 1/6041* (2013.01); *H04N 1/6075* (2013.01)

(58) Field of Classification Search
None
See application file for complete search history.

(56) References Cited

U.S. PATENT DOCUMENTS

| 8,134,744 B2 * | 3/2012 | Sawada ................ H04N 1/6022 345/591 |
| 8,705,122 B2 * | 4/2014 | Matsuzaki ......... H04N 1/00015 358/1.9 |
| 9,485,390 B2 * | 11/2016 | Tamagawa ............... H04N 1/54 |
| 2004/0257621 A1 * | 12/2004 | Ishihara ............... H04N 1/6072 358/2.1 |

(Continued)

FOREIGN PATENT DOCUMENTS

JP 9-006956 A 1/1997

*Primary Examiner* — Dung D Tran
(74) *Attorney, Agent, or Firm* — Sughrue Mion, PLLC

(57) ABSTRACT

A color processing apparatus includes a processor configured to implement first, second, and third acquiring units. The first acquiring unit acquires first color data indicating association among first-space color in a first space, second-space color obtained by reading measurement images having different first-space colors, and third-space color obtained by converting the second-space color through a predetermined transformation model. The second acquiring unit acquires second color data indicating association between the first-space color and the third-space color obtained by performing color measurement on some of the specific-color measurement images containing a specific color in the first space and included in the measurement images. The third acquiring unit acquires third color data indicating association between the first-space color and the third-space color obtained by converting the first-space color through a transformation equation obtained from the first and second color data. The conversion is performed on the other specific-color measurement images.

12 Claims, 9 Drawing Sheets

(56) References Cited

U.S. PATENT DOCUMENTS

| | | | |
|---|---|---|---|
| 2007/0030505 A1* | 2/2007 | Ito | H04N 1/6033 358/1.9 |
| 2009/0002390 A1* | 1/2009 | Kuno | H04N 1/6058 345/593 |
| 2012/0274958 A1* | 11/2012 | Hoshino | G06K 15/1878 358/1.9 |
| 2015/0092204 A1* | 4/2015 | Tashiro | G06K 15/1878 358/1.9 |
| 2015/0172511 A1* | 6/2015 | Matsuzaki | H04N 1/6025 358/3.23 |
| 2015/0237235 A1* | 8/2015 | Mori | H04N 1/6033 358/1.9 |

* cited by examiner

FIG. 4

| IDENTIFIER | C | M | Y | K | L | A | B | EVALUATION |
|---|---|---|---|---|---|---|---|---|
| a | 30 | 50 | 70 | 20 | 50 | 9 | 26 | SELECTED |
| b | 50 | 10 | 0 | 15 | 61 | -14 | -27 | SELECTED |
| c | 0 | 20 | 50 | 50 | 47 | 2 | 23 | NOT SELECTED |
| d | 30 | 50 | 70 | 10 | 54 | 10 | 29 | NOT SELECTED |
| e | 10 | 50 | 10 | 10 | 60 | 30 | -8 | SELECTED |
| f | 0 | 20 | 45 | 45 | 51 | 3 | 22 | NOT SELECTED |
| ... | ... | ... | ... | ... | ... | ... | ... | ... |

| CMYK | RGB | Lab |
|---|---|---|
| 30/40/50/ 50 | R1/G1/B1 | 50, 10, 10 |
| 20/100/60/ 15 | R2/G2/B2 | 40, 30, 40 |
| 50/50/0/ 100 | R3/G3/B3 | 30, 10 -40 |
| ... | ... | ... |

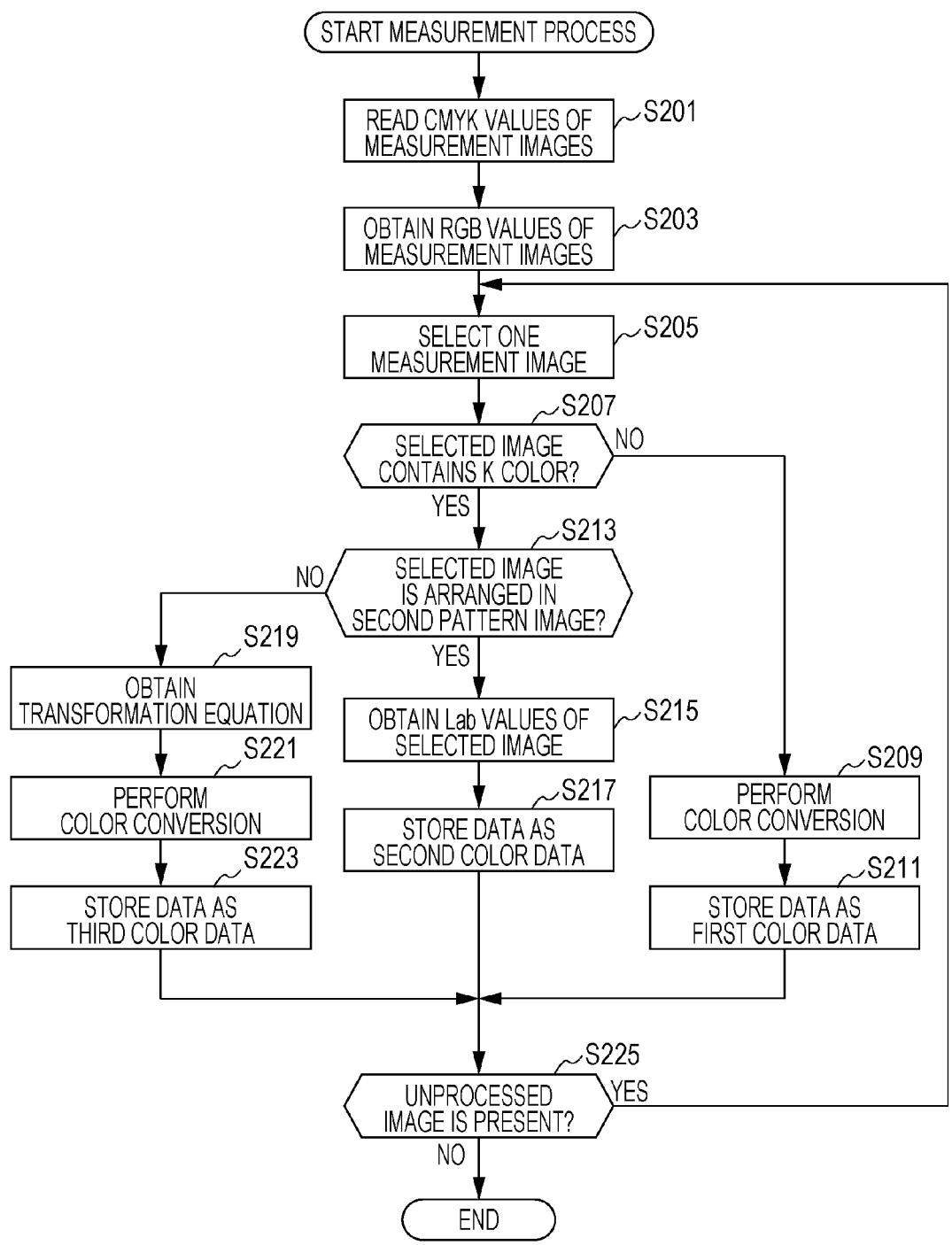

US 10,021,274 B2

COLOR PROCESSING APPARATUS, COLOR PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-037936 filed Feb. 28, 2016.

BACKGROUND

Technical Field

The present invention relates to a color processing apparatus, a color processing system, and a non-transitory computer readable medium.

SUMMARY

According to an aspect of the invention, there is provided a color processing apparatus including a first acquiring unit, a second acquiring unit, and a third acquiring unit. The first acquiring unit acquires first color data indicating association among first-space color in a first space, second-space color in a second space, and third-space color in a third space. The second-space color is obtained by using a reading unit reading measurement images whose colors in the first space are different from one another. The third-space color is obtained by converting the second-space color by using a predetermined transformation model. The second acquiring unit acquires second color data indicating association between the first-space color and the third-space color obtained by using a measuring unit performing color measurement on a first specific-color measurement image set. The first specific-color measurement image set is constituted by some of specific-color measurement images included in the measurement images. Each of the specific-color measurement images contains a specific color in the first space. The third acquiring unit acquires third color data indicating association between the first-space color and the third-space color obtained by converting the first-space color by using a transformation equation obtained from the first color data and the second color data. The conversion is performed on a second specific-color measurement image set constituted by specific-color measurement images other than the first specific-color measurement image set among the specific-color measurement images.

BRIEF DESCRIPTION OF THE DRAWINGS

Exemplary embodiment of the present invention will be described in detail based on the following figures, wherein:

FIG. 4 is a table illustrating an exemplary method for selecting K color images that are to be arranged in a second pattern image, according to the exemplary embodiment;

FIG. 10 is a flowchart illustrating a flow for a program for a measurement process according to the exemplary embodiment.

DETAILED DESCRIPTION

A color processing system according to an exemplary embodiment will be described below with reference to the attached drawings.

Figure 1:
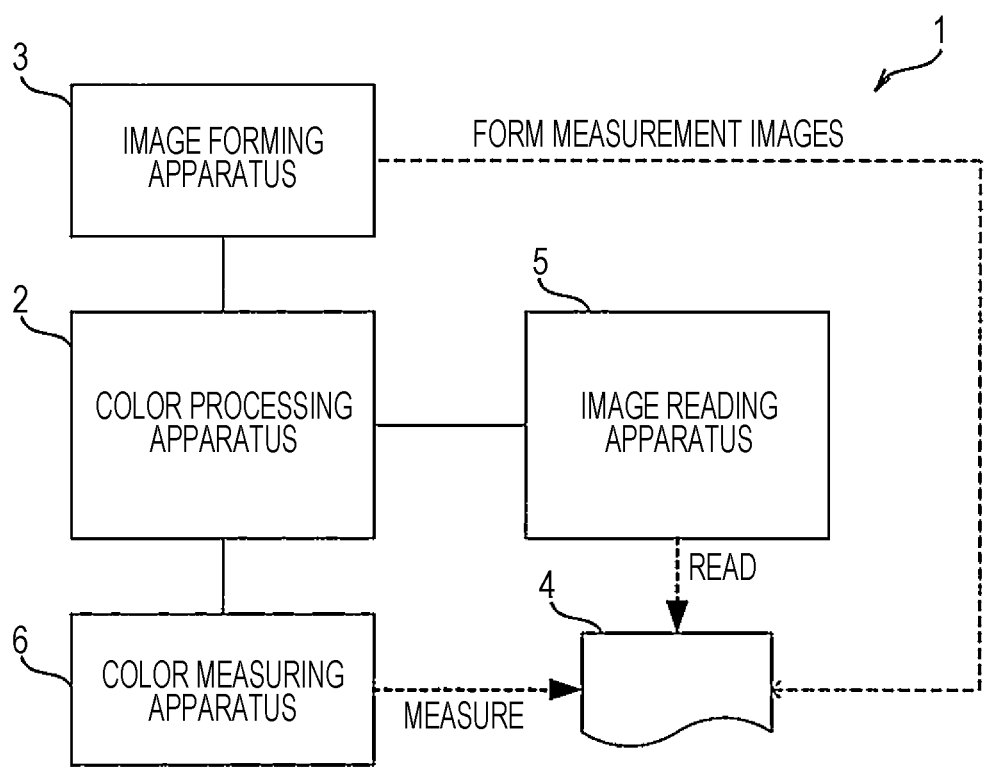
FIG. 1 is a block diagram illustrating the overall configuration of a color processing system according to an exemplary embodiment.

As illustrated in FIG. 1, a color processing system 1 according to the exemplary embodiment includes a color processing apparatus 2 described below, and an image forming apparatus 3 which forms an image on a sheet 4. The color processing system 1 also includes an image reading apparatus (what is called a scanner) 5 which is an exemplary reading unit and which reads an image formed on a sheet 4 by the image forming apparatus 3, and a color measuring apparatus 6 which is an exemplary color measurement unit and which measures the color of an image formed on a sheet 4 by the image forming apparatus 3. Examples of the color measuring apparatus 6 include a spectrophotometer and a light emitting diode (LED) colorimeter.

Figure 2:
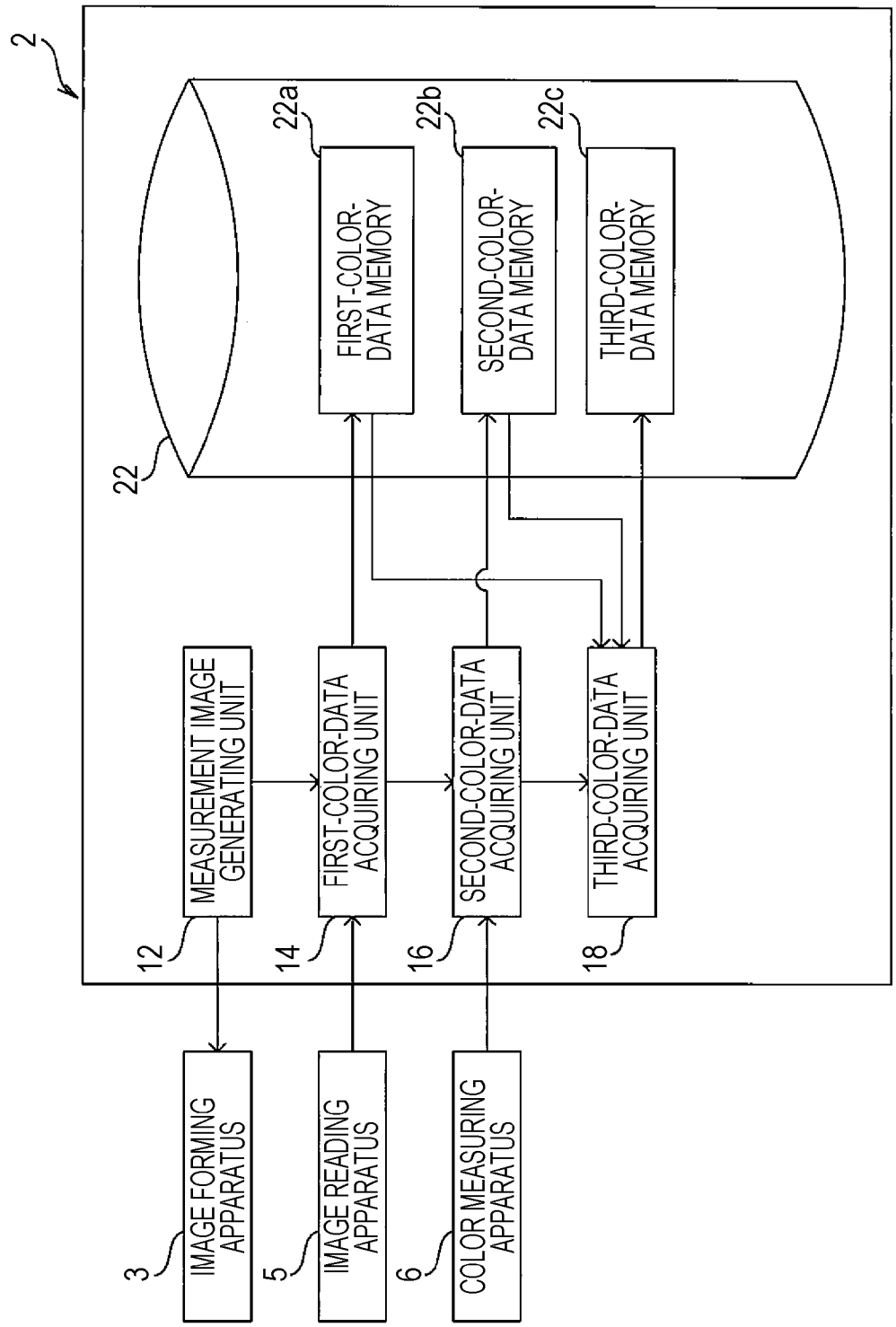
FIG. 2 is a block diagram illustrating the functional configuration of a color processing apparatus according to the exemplary embodiment.

As illustrated in FIG. 2, the color processing apparatus 2 includes a measurement image generating unit 12, a first-color-data acquiring unit 14, a second-color-data acquiring unit 16, a third-color-data acquiring unit 18, and a color processing data memory 22. The color processing data memory 22 includes a first-color-data memory 22a, a second-color-data memory 22b, and a third-color-data memory 22c.

The measurement image generating unit 12 generates a pattern image by generating and arranging multiple measurement images 32, for each of which the color is measured and each of which has a color different from that of another image. The measurement image generating unit 12 transmits, to the image forming apparatus 3, image data indicating the generated pattern images.

Figure 3:
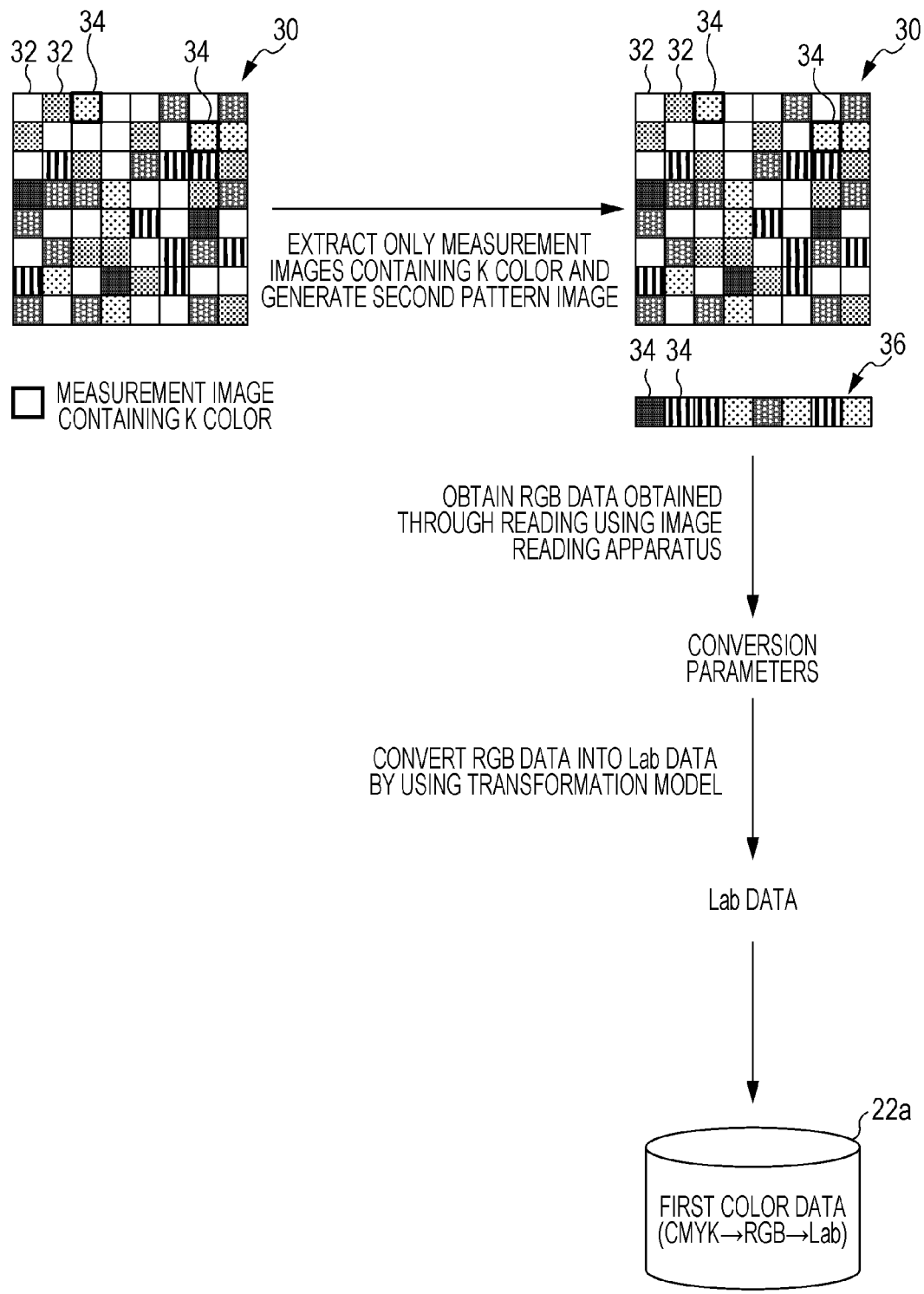
FIG. 3 is a schematic diagram illustrating a method for generating first color data according to the exemplary embodiment.

In the present exemplary embodiment, the measurement image generating unit 12 first generates each of the measurement images 32 by using color in CMYK space which is an exemplary first space, and generates a first pattern image 30 in which the generated measurement images 32 are arranged in a grid. At that time, the measurement image generating unit 12 generates some of the multiple measurement images 32 (for example, 30% of all) as K color images 34 formed by using colors containing a specific color. As illustrated in FIG. 3, the measurement image generating unit 12 disposes the K color images 34 at random in the first pattern image 30. Herein, a specific color is a color for which no associations are present between CMYK space and RGB space. In the present exemplary embodiment, a description will be made by using K color as the specific color. The K color images 34 disposed at random achieves avoidance of a state in which non-uniformity on the surface which is produced in image formation causes the color of a measurement image 32 that does not contain K color, to be changed to a color including K color through color correction.

Then, the measurement image generating unit 12 extracts K color images 34 from the generated measurement images 32, and generates a second pattern image 36 in which the extracted K color images 34 are arranged. In the present exemplary embodiment, as described below, in consideration of color measurement on the second pattern image 36 using the color measuring apparatus 6, the measurement image generating unit 12 arranges the K color images 34 in the second pattern image 36 in a line.

The measurement image generating unit 12 transmits, to the image forming apparatus 3, image data in which the first pattern image 30 is disposed in a first region of a sheet 4 and in which the second pattern image 36 is disposed in a second region of the sheet 4 which is different from the first region. Upon reception of the image data, the image forming apparatus 3 forms an image based on the received image data on a sheet 4.

The first pattern image 30 is used to be read by the image reading apparatus 5. The second pattern image 36 is used in color measurement performed by the color measuring apparatus 6. In reading an image by using the image reading apparatus 5, the entire image is read at once. In contrast, in color measurement on an image using the color measuring apparatus 6, a user holds the color measuring apparatus 6 and moves the color measuring apparatus 6 along an image for which the color is to be measured, whereby color measurement is performed. Therefore, when the color measuring apparatus 6 is used to perform color measurement on an image, more time and effort are required in comparison with a case in which the image reading apparatus 5 is used to read an image.

Therefore, in the present exemplary embodiment, a predetermined number (for example, several tens) of K color images 34 are selected from the K color images 34 disposed in the first pattern image 30, and the selected K color images 34 are arranged in a line in the second pattern image 36. Thus, by arranging the K color images 34 in a line, a single operation in which a user moves the color measuring apparatus 6 along the line along which the second pattern image 36 extends enables a series of color measurement operations to be performed. In the present exemplary embodiment, the K color images 34 are arranged in a line in the second pattern image 36. However, the arrangement pattern is not limited to this. Any arrangement pattern may be employed as long as the pattern is suitable for color measurement using the color measuring apparatus 6. For example, when the color measuring apparatus 6 is capable of performing color measurement on three lines of K color images 34 at once, the K color images 34 may be arranged in three lines.

In the present exemplary embodiment, to alleviate time and effort required for color measurement, some of the K color images 34 included in the first pattern image 30 are arranged in the second pattern image 36.

FIG. 4 illustrates an exemplary method for selecting K color images 34 that are to be arranged in the second pattern image 36. For example, as illustrated in FIG. 4, Lab space colors obtained by converting CMYK space colors of K color images 34 into colors in Lab space which is an exemplary third space are used to select K color images 34 that are to be arranged in the second pattern image 36. In the present exemplary embodiment, either of two selection methods (A) and (B) described below is used to select K color images 34 that are to be arranged in the second pattern image 36.

(A) K color images 34 are selected so that the color difference between each pair of the K color images 34 is equal to or more than a predetermined threshold.

(B) Hue in Lab space is divided into a predetermined number (for example, six) of parts; chroma is divided into a predetermined number (for example, three) of parts; and brightness is divided into a predetermined number (for example, three) of parts. K color images 34 are selected so that a predetermined number (for example, two) or more of colors are not present in each of the divided spaces obtained through the dividing operations.

FIG. 4 illustrates an example obtained by using the selection method (A) described above. In the example in FIG. 4, a K color image 34 corresponding to a color for which "Selected" is described in the "evaluation" field is selected, and a K color image 34 corresponding to a color for which "Not Selected" is described is not selected. For example, when the color for an identifier a is first selected, the color difference between the color for the identifier a which is already selected and the color for an identifier b is equal to or more than the threshold. Therefore, the color for the identifier b is also selected. The color difference between the color for the identifier a which is already selected and the color for an identifier c is less than the threshold, and the color difference between the color for the identifier a which is already selected and the color for an identifier d is less than the threshold. Therefore, the color for the identifier c and the color for the identifier d are not selected. In contrast, the color difference between the color for the identifier a which is already selected and the color for an identifier e is equal to or more than the threshold, and the color difference between the color for the identifier b which is already selected and the color for the identifier e is equal to or more than the threshold. Therefore, the color for the identifier e is selected. Thus, K color images 34 are selected so that the color difference between each pair of colors is equal to or more than the threshold.

As illustrated in FIG. 3, the first-color-data acquiring unit 14 obtains image data obtained by using the image reading apparatus 5 reading the first pattern image 30 on a sheet 4. In the present exemplary embodiment, the first-color-data acquiring unit 14 obtains RGB data which is image data obtained by reading, as color in RGB space which is an exemplary second space, the colors of the measurement images 32 generated by using CMYK space color.

The first-color-data acquiring unit 14 uses a transformation model for converting RGB space color into Lab space color, so as to convert the obtained RGB data into Lab data which is image data obtained by converting each color in the RGB data into a Lab space color. In the present exemplary embodiment, multiple measurement images are used to obtain associations between colors in RGB space and colors in Lab space in advance. This information is stored as a transformation model based on the associations. The first-color-data acquiring unit 14 uses the stored transformation model to convert each color in RGB data into a Lab space color.

In the case where the transformation model is used, a color which does not contain K color and a color which contains only K color are converted with high accuracy. In contrast, a color which contains K color with other colors may be converted with low accuracy. Therefore, as described below, for a color which contains K color with other colors, a Lab value obtained through color measurement using the color measuring apparatus 6 is also used to improve the accuracy in conversion.

The first-color-data acquiring unit 14 stores the Lab data obtained through conversion, in the first-color-data memory 22a. The first color data is information in which the CMYK space color of each of the measurement images 32 arranged in the first pattern image 30, the RGB space color obtained through reading, and the Lab space color obtained through conversion are associated with one another.

Figure 5:
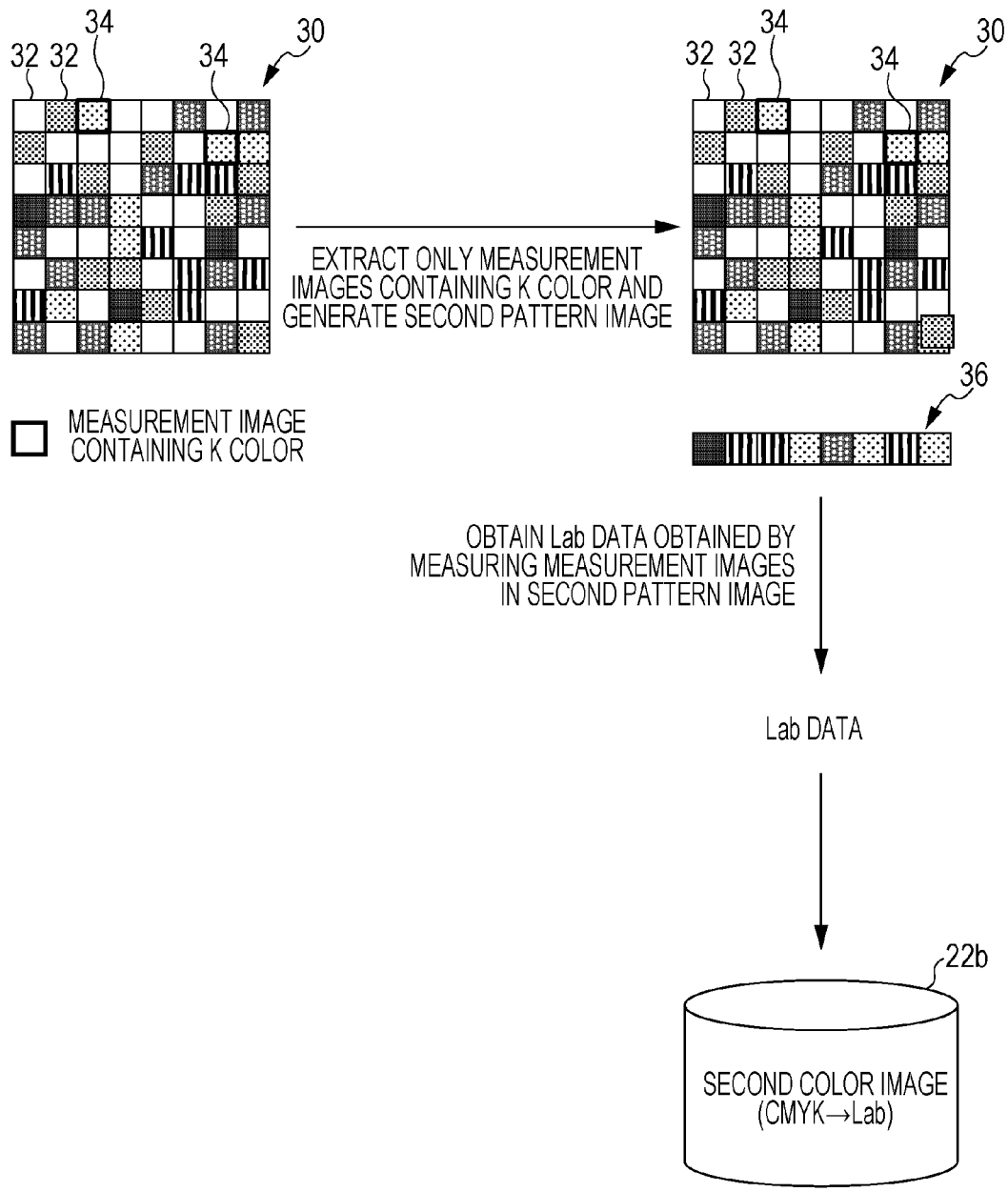
FIG. 5 is a schematic diagram illustrating a method for generating second color data, according to the exemplary embodiment.
Figure 6:
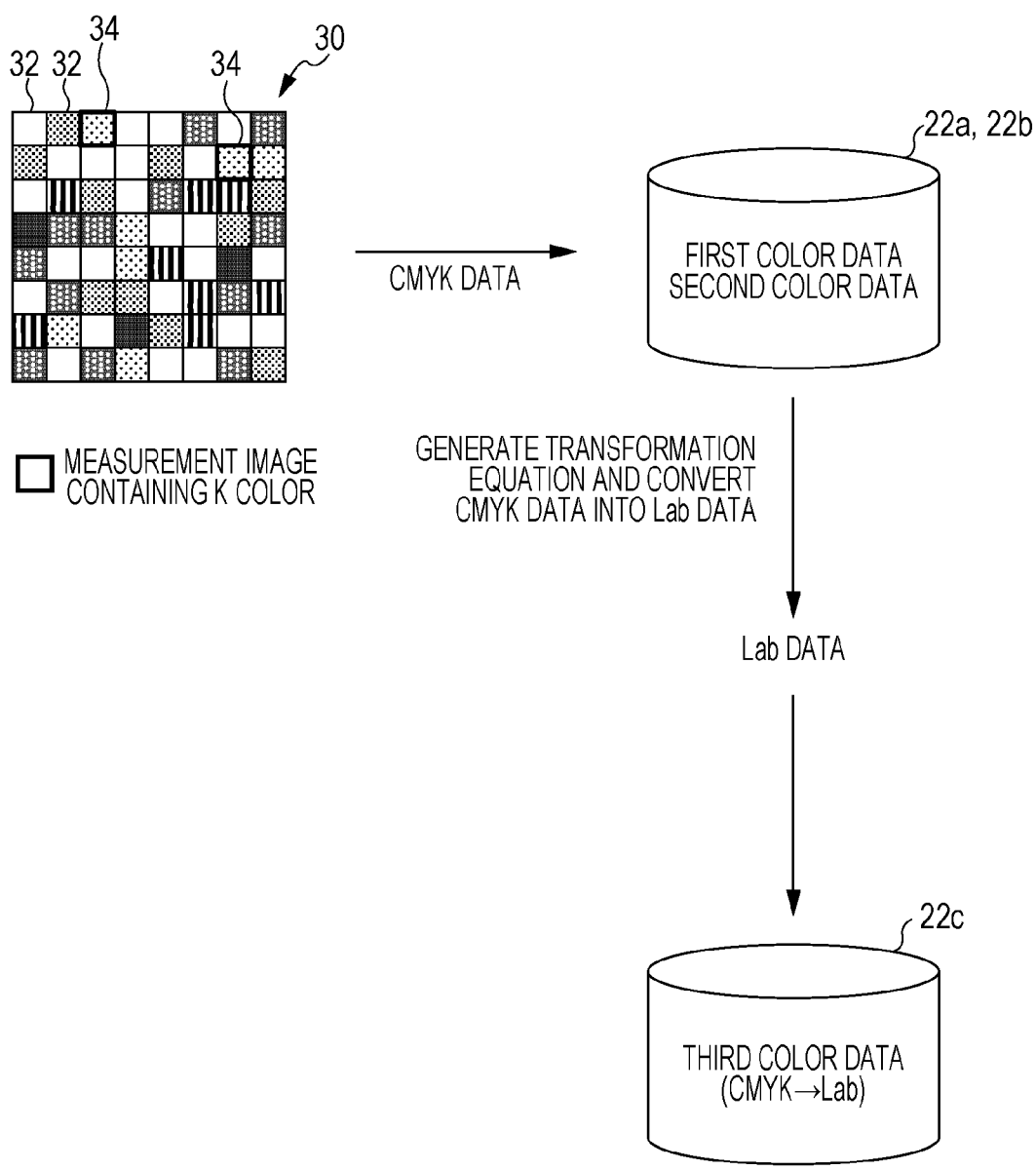
FIG. 6 is a schematic diagram illustrating a method for generating third color data, according to the exemplary embodiment.

As illustrated in FIG. 5, the second-color-data acquiring unit 16 obtains color measurement data by using the color measuring apparatus 6 measuring the colors of the second pattern image 36 on a sheet 4. In the present exemplary embodiment, the second-color-data acquiring unit 16 obtains Lab data which is image data obtained by reading, as Lab space color, the colors of measurement images 32 generated by using CMYK space color. Then, the second-color-data acquiring unit 16 stores the converted Lab data into the second-color-data memory 22b. The second color data is information in which the CMYK space color of each of the K color images 34 arranged in the second pattern image 36 is associated with the converted Lab space color.

The third-color-data acquiring unit 18 obtains the first color data from the first-color-data memory 22a, and also obtains the second color data from the second-color-data memory 22b.

For each of the K color images 34 arranged in the second pattern image 36, the third-color-data acquiring unit 18 extracts the association between CMYK color and Lab space color from the second color data. The third-color-data acquiring unit 18 obtains the RGB space color corresponding to the color of each K color image 34 included in the second color data, from the first color data. Thus, for example, as illustrated in FIG. 7, for each K color image 34 arranged in the second pattern image 36, the CMYK color, the RGB color, and the Lab space color are associated with one another.

The third-color-data acquiring unit 18 generates a transformation equation for converting an RGBK space color 38 into a Lab space color, from the associations among CMYK color, RGB color, and Lab space color. The RGBK space color 38 is color in which K color in CMYK space is added to the colors in RGB space. In the present exemplary embodiment, for the K color images 34 arranged in the second pattern image 36, an approximate expression representing associations between the value sets of the RGBK space color 38 and the Lab space colors is obtained. The obtained approximate expression is used as a transformation equation for converting an RGBK space color 38 into a Lab space color.

The third-color-data acquiring unit 18 extracts K color images 34 that have not been arranged in the second pattern image 36, from the multiple K color images 34. For each of the K color images 34 which have not been arranged in the second pattern image 36, the third-color-data acquiring unit 18 also obtains the association between the CMYK space color of the K color image 34 and the RGB space color obtained through reading, from the first color data. The third-color-data acquiring unit 18 extracts the RGBK space color 38 from the obtained association. By substituting the RGBK space color 38 into the above-described transformation equation, the third-color-data acquiring unit 18 converts the RGBK space color 38 into a Lab space color. Thus, for each of the K color images 34 which have not been arranged in the second pattern image 36, the CMYK color, the RGB color, and the Lab space color are associated with one another.

Figures 7, 8:
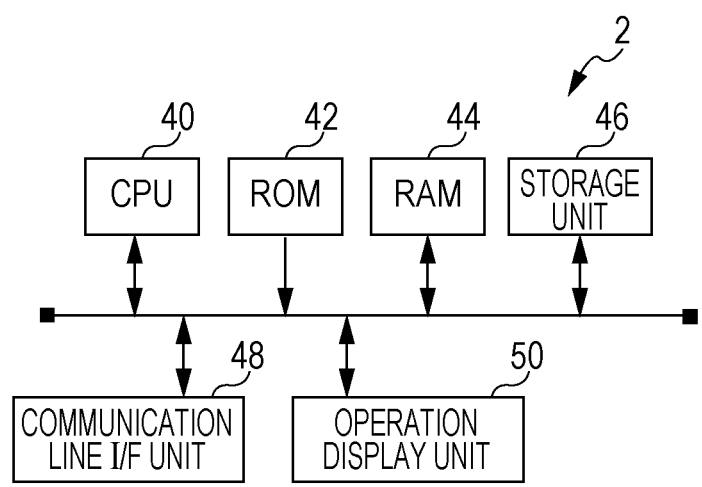
FIG. 7 is a table illustrating an exemplary method for generating a transformation equation for converting CMYK space color into Lab space color, according to the exemplary embodiment.
FIG. 8 is a block diagram illustrating the electrical configuration of the color processing apparatus according to the exemplary embodiment.

As illustrated in FIG. 8, the color processing apparatus 2 according to the present exemplary embodiment includes a central processing unit (CPU) 40 which controls the entire apparatus. The units of the color processing apparatus 2 are controlled by the CPU 40, and are implemented. The CPU 40 is connected to a read only memory (ROM) 42 which stores programs and various types of information which are used in the process performed by the CPU 40. The CPU 40 is also connected to a random access memory (RAM) 44 which serves as a work area for the CPU 40 and which stores various data temporarily, and a storage unit 46 such as a nonvolatile memory which stores various types of information used in the process performed by the CPU 40. The color processing data memory 22 is provided in the storage unit 46. The CPU 40 is further connected to a communication line I/F (interface) unit 48 which inputs/outputs data from/to an external apparatus connected to the color processing apparatus 2. The communication line I/F unit 48 is connected to the above-described image forming apparatus 3, the above-described image reading apparatus 5, and the color measuring apparatus 6. The CPU 40 is also connected to an operation display unit 50 which has a keyboard, a mouse, and the like for inputting data and a display and the like for displaying data.

Figure 9:
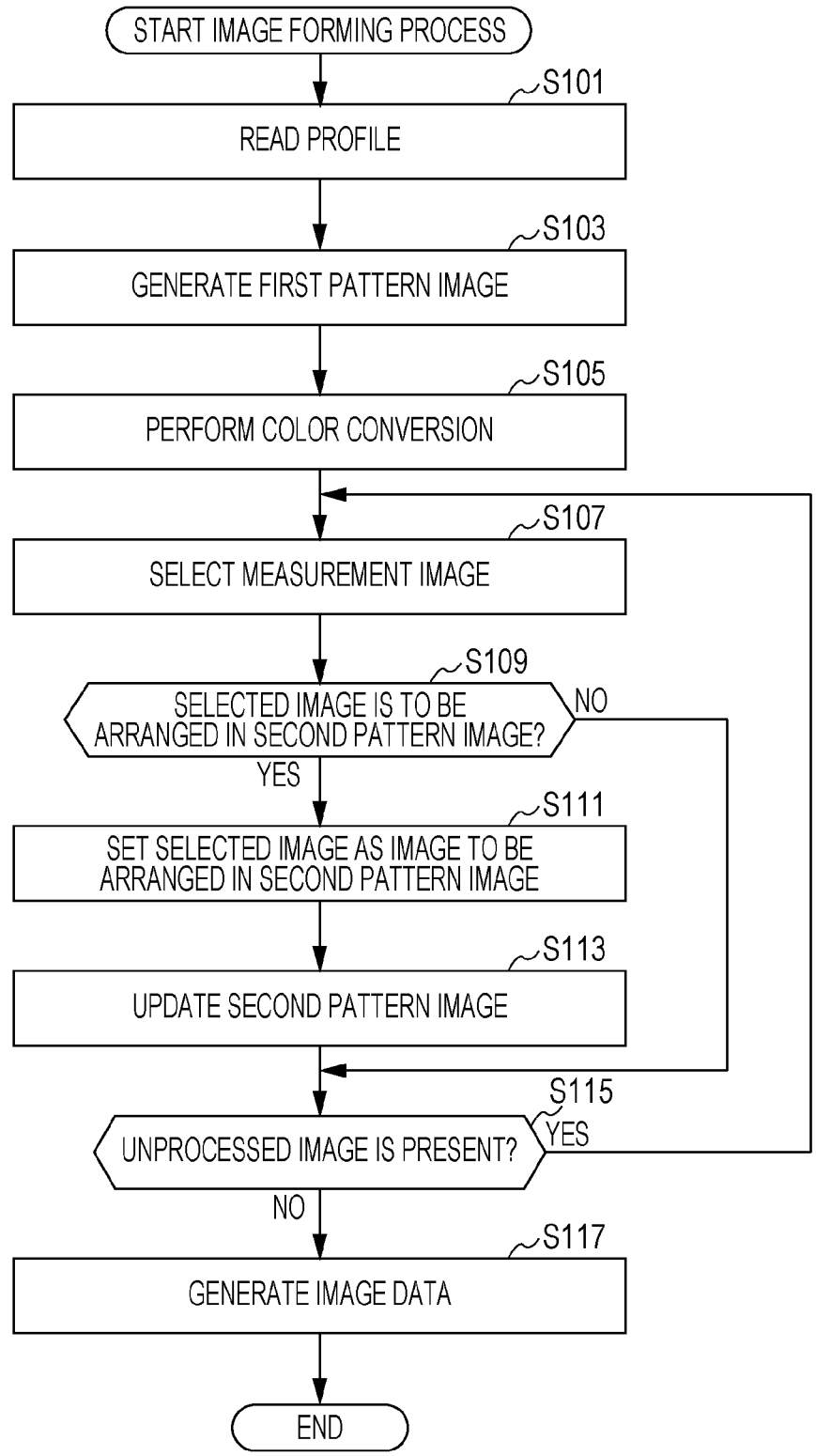
FIG. 9 is a flowchart illustrating a flow for a program for an image forming process according to the exemplary embodiment.

A process flow used when the color processing apparatus 2 according to the present exemplary embodiment performs an image forming process will be described by referring to the flowchart in FIG. 9. The image forming process is a process of generating the first pattern image 30 and the second pattern image 36.

In the present exemplary embodiment, a program for the image forming process is stored in the storage unit 46 in advance. However, this is not limiting. For example, the program for the image forming process may be received from an external apparatus via the communication line I/F unit 48, and may be executed. Alternatively, the program for the image forming process which is recorded in a recording medium such as a compact disc-read-only memory (CD-ROM) may be read by using a CD-ROM drive or the like, whereby the image forming process may be executed.

In the present exemplary embodiment, the program for the image forming process is executed when an execution instruction is input through an operation performed by a user on the operation display unit 50. However, the timing to start execution is not limited to this. For example, the program may be executed at a timing at which the image forming apparatus 3 is activated.

In step S101, the measurement image generating unit 12 reads a color profile of the image forming apparatus 3. Typically, in formation of images using image forming apparatuses, even when the same image data is output, the colors of output images may be different from each other depending on the models of the apparatuses. Therefore, for each of the models of image forming apparatuses, a color profile indicating color characteristics of the image forming apparatus is prepared in advance, and is stored in the storage unit 46. The measurement image generating unit 12 reads this color profile.

In step S103, the measurement image generating unit 12 generates measurement images 32, and also generates the first pattern image 30 which is to be read by the image reading apparatus 5, and the second pattern image 36 which is to be subjected to color measurement by the color measuring apparatus 6.

In step S105, the measurement image generating unit 12 converts the color of each measurement image 32 included in the generated first pattern image 30, on the basis of the color profile which has been read. Thus, the colors of the measurement images 32 are converted in accordance with the characteristics of the image forming apparatus 3.

In step S107, the measurement image generating unit 12 selects one measurement image 32 from the measurement images 32 arranged in the first pattern image 30. In the present exemplary embodiment, the measurement images 32 arranged in a grid in the first pattern image 30 are sequentially selected from top left.

In step S109, the measurement image generating unit 12 determines whether or not the selected measurement image 32 is to be arranged in the second pattern image 36, on the basis of the CMYK values of the selected measurement image 32. At that time, the measurement image generating unit 12 determines whether or not the measurement image 32 is to be arranged in the second pattern image 36 by using the above-described selection method (A) or (B). If it is determines that the selected measurement image 32 is to be arranged in the second pattern image 36 in step S109 (Yes in step S109), the process proceeds to step S111. If it is determined that the selected measurement image 32 is not to be arranged in the second pattern image 36 in step S109 (No in step S109), the process proceeds to step S115.

In step S111, the measurement image generating unit 12 uses the selected measurement image 32 as an image that is to be arranged in the second pattern image 36.

In step S113, the measurement image generating unit 12 arranges the selected measurement image 32 as a new image in the second pattern image 36, and updates the second pattern image 36.

In step S115, the measurement image generating unit 12 determines whether or not a measurement image 32 which has not been processed, that is, a measurement image 32 which has not been subjected to the processes from step S107 to step S113, is present. If it is determined that a measurement image 32 which has not been processed is present, in step S115 (Yes in step S115), the process returns back to step S107. If it is determined that no measurement images 32 that have not been processed are present (No in step S115), the process proceeds to step S117.

In step S117, the measurement image generating unit 12 generates image data in which the first pattern image 30 is disposed in the first region of a sheet 4 and in which the second pattern image 36 is disposed in the second region of the sheet 4, and the program for the image forming process is ended. The measurement image generating unit 12 transmits the generated image data to the image forming apparatus 3. The measurement image generating unit 12 also transmits information indicating the CMYK values of the measurement images 32 arranged in the first pattern image 30 and the CMYK values of the measurement images 32 arranged in the second pattern image 36.

Upon reception of the image data from the color processing apparatus 2, the image forming apparatus 3 forms the first pattern image 30 and the second pattern image 36 on a sheet 4 on the basis of the image data. The color processing apparatus 2 performs a measurement process of measuring the colors of the measurement images 32 on the basis of the first pattern image 30 and the second pattern image 36 which are formed on the sheet 4.

The process flow used when the color processing apparatus 2 according to the present exemplary embodiment performs the measurement process will be described by referring to the flowchart illustrated in FIG. 10.

In the present exemplary embodiment, a program for the measurement process is stored in the storage unit 46 in advance. However, this is not limiting. For example, the program for the measurement process may be received from an external apparatus via the communication line I/F unit 48, and may be executed. Alternatively, the program for the measurement process which is recorded in a recording medium such as a CD-ROM may be read by using a CD-ROM drive or the like, whereby the measurement process may be executed.

In the present exemplary embodiment, the program for the measurement process is executed when an execution instruction is input through an operation performed by a user on the operation display unit 50. However, the timing to start execution is not limited to this. For example, the program may be executed at a timing at which both of the following conditions are satisfied: a result of the reading operation on measurement images 32 is received from the image reading apparatus 5; and a result of color measurement on measurement images 32 is received from the color measuring apparatus 6.

In step S201, the first-color-data acquiring unit 14 reads information indicating the CMYK values of the measurement images 32 arranged in the first pattern image 30 and the CMYK values of the measurement images 32 arranged in the second pattern image 36.

In step S203, the first-color-data acquiring unit 14 obtains the RGB values which are obtained through the reading operation performed by the image reading apparatus 5, and which are values of the measurement images 32 arranged in the first pattern image 30.

In step S205, the first-color-data acquiring unit 14 selects one measurement image 32 from the measurement images 32 arranged in the first pattern image 30. In the present exemplary embodiment, the measurement images 32 arranged in a grid in the first pattern image 30 are sequentially selected from top left.

In step S207, the first-color-data acquiring unit 14 determines whether or not the selected measurement image 32 contains K color, on the basis of the CMYK values of the selected measurement image 32. If it is determined that the selected measurement image 32 contains K color in step S207 (Yes in step S207), the process proceeds to step S213. If it is determined that the selected measurement image 32 does not contain K color (No in step S207), the process proceeds to step S209.

In step S209, the first-color-data acquiring unit 14 converts the RGB space color of the selected measurement image 32 into a Lab space color by using the above-described transformation model.

In step S211, the first-color-data acquiring unit 14 associates the CMYK value set, the RGB value set, and the Lab value set of the selected measurement image 32 with one another, and stores the association into the first-color-data memory 22a.

In step S213, the second-color-data acquiring unit 16 determines whether or not the selected measurement image 32 is arranged in the second pattern image 36, on the basis of the CMYK values of the measurement image 32. If it is determined that the measurement image 32 is arranged in the second pattern image 36, in step S213 (Yes in step S213), the process proceeds to step S215. If it is determined that the measurement image 32 is not arranged in the second pattern image 36, in step S213 (No in step S213), the process proceeds to step S219.

In step S215, for the selected measurement image 32, the second-color-data acquiring unit 16 obtains Lab values obtained through color measurement performed by the color measuring apparatus 6.

In step S217, the second-color-data acquiring unit 16 associates the CMYK value set and the Lab value set of the selected measurement image 32 with each other, and stores the association in the second-color-data memory 22b.

In step S219, the third-color-data acquiring unit 18 obtains a transformation equation for converting RGBK space color into Lab space color. If a transformation equation is not stored, the first color data stored in the first-color-data memory 22a and the second color data stored in the second-color-data memory 22b are used to generate a transformation equation, which is stored in the storage unit 46, as described above.

In step S221, the third-color-data acquiring unit 18 uses the obtained transformation equation to convert the RGBK space color of the selected measurement image 32 into a Lab space color.

In step S223, the third-color-data acquiring unit 18 associates the CMYK value set and the Lab value set of the selected measurement image 32 with each other, and stores the association into the third-color-data memory 22c.

In step S225, the first-color-data acquiring unit 14 determines whether or not a measurement image 32 which has not been processed, that is, a measurement image 32 which has not been subjected to the processes from step S205 to step S223, is present. If it is determined that a measurement image 32 which has not been processed is present, in step S225 (Yes in step S225), the process proceeds to step S205. If it is determined that no measurement images 32 which have not been processed are present (No in step S225), execution of the program for the measurement process is ended.

Thus, in the present exemplary embodiment, the first color data indicating association among the CMYK space color of a measurement image 32, the RGB space color obtained by using the image reading apparatus 5 reading the measurement image 32, and the Lab space color obtained by converting the RGB space color by using the transformation model is obtained. In addition, the second color data indicating association between the CMYK space color of each of some of the K color images 34 and the Lab space color obtained by using the color measuring apparatus 6 performing color measurement on the K color image 34 is obtained. Further, the third color data indicating association between the CMYK space color of each of the other K color images 34 and the Lab space color obtained by converting the CMYK space color of the K color image 34 by using the transformation equation obtained from the first color data and the second color data is obtained. Thus, regardless of whether or not a color to be measured contains K color, the color may be measured with high accuracy.

In the present exemplary embodiment, the color processing system 1 in which the color processing apparatus 2 is connected to the image forming apparatus 3, the image reading apparatus 5, and the color measuring apparatus 6 is described. However, this is not limiting. For example, the present invention is also applied to a color processing system in which the color processing apparatus 2, the image forming apparatus 3, the image reading apparatus 5, and the color measuring apparatus 6 are formed as an integral unit. In addition, the present invention is also applied to a color processing system in which the color processing apparatus 2, the image forming apparatus 3, and the image reading apparatus 5 are formed as an integral unit and in which the color measuring apparatus 6 is connected to the color processing apparatus 2.

The color processing apparatus 2 is not necessarily connected to the image forming apparatus 3, the image reading apparatus 5, and the color measuring apparatus 6. In this case, the color processing apparatus 2 may obtain the CMYK values of the measurement images 32 included in the first pattern image 30, and the CMYK values of the K color images 34 included in the second pattern image 36. In this case, the color processing apparatus 2 may obtain the RGB values obtained by reading the measurement images 32 included in the first pattern image 30, and the Lab values obtained by measuring the colors of the K color images 34 included in the second pattern image 36.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
   at least one hardware processor configured to implement:
      a first acquiring unit that acquires first color data indicating association among first-space color in a first space, second-space color in a second space, and third-space color in a third space, the second-space color being obtained by using a reading unit reading a plurality of measurement images whose colors in the first space are different from one another, the third-space color being obtained by converting the second-space color by using a predetermined transformation model;
      a second acquiring unit that acquires second color data indicating association between the first-space color and the third-space color obtained by using a measuring unit performing color measurement on a first specific-color measurement image set, the first specific-color measurement image set being constituted by some of a plurality of specific-color measurement images, the plurality of specific-color measurement images being included in the plurality of measurement images, each of the plurality of specific-color measurement images containing a specific color in the first space; and
      a third acquiring unit that acquires third color data indicating association between the first-space color and the third-space color obtained by converting the first-space color by using a transformation equation obtained from the first color data and the second color data, the conversion being performed on a second specific-color measurement image set, the second specific-color measurement image set being constituted by specific-color measurement images other than the first specific-color measurement image set among the plurality of specific-color measurement images.

2. The color processing apparatus according to claim 1, wherein the reading unit obtains the second-space color by reading a first pattern image in which the plurality of measurement images are arranged, and wherein the measuring unit obtains the second color data by performing color measurement on a second pattern image in which the plurality of specific-color measurement images are arranged.

3. The color processing apparatus according to claim 2, wherein the second pattern image is an image in which measurement images selected from the plurality of specific-color measurement images are arranged, and
wherein a selection of the measurement images is performed in such a manner that a color difference between each pair of the selected measurement images is equal to or more than a predetermined threshold.

4. The color processing apparatus according to claim 2, wherein the third space is a color space having a hue axis, a chroma axis, and a brightness axis,
wherein the second pattern image is an image in which measurement images selected from the plurality of specific-color measurement images are arranged, and
wherein a selection of the measurement images is performed in such a manner that the third space is divided into divided spaces in at least one of a hue direction, a chroma direction, and a brightness direction, and that a number of colors of the selected specific color measurement images contained in each of the divided spaces is less than a predetermined number.

5. The color processing apparatus according to claim 3, wherein the third space is a color space having a hue axis, a chroma axis, and a brightness axis, and
the selection is further performed in such a manner that the third space is divided into divided spaces in at least one of a hue direction, a chroma direction, and a brightness direction, and that each of the divided spaces contains colors of the selected specific-color measurement images, a number of colors being less than a predetermined number.

6. The color processing apparatus according to claim 2, wherein the second pattern image is an image in which the plurality of specific-color measurement images are arranged in a line.

7. The color processing apparatus according to claim 3, wherein the second pattern image is an image in which the selected measurement images are arranged in a line.

8. The color processing apparatus according to claim 4, wherein the second pattern image is an image in which the selected measurement images are arranged in a line.

9. The color processing apparatus according to claim 5, wherein the second pattern image is an image in which the selected measurement images are arranged in a line.

10. A color processing system comprising:
the color processing apparatus according to claim 1,
wherein the at least one hardware processor is further configured to implement:
the reading unit that reads a plurality of measurement images whose colors in the first space are different from one another; and
the measuring unit that performs color measurement on a plurality of measurement images whose colors in the first space are different from one another.

11. A non-transitory computer readable medium storing a program configured to instruct the at least one hardware processor to implement the first acquiring unit, the second acquiring unit and the third acquiring unit included in the color processing apparatus according to claim 1.

12. The color processing apparatus according to claim 1, wherein
the first space comprises a CMYK color space,
the second space comprises an RGB color space, and
the third space comprises an Lab color space.

* * * * *